United States Patent
Prymula et al.

(10) Patent No.: US 11,628,991 B2
(45) Date of Patent: Apr. 18, 2023

(54) PRESSURE RELIEF ASSEMBLIES AND METHODS

(71) Applicant: Illinois Tool Works Inc., Glenview, IL (US)

(72) Inventors: David A. Prymula, Allegan, MI (US); Randall J. Schoenborn, Allendale, MI (US); Bradley Hazard, Glenview, IL (US); Umang Shukla, Glenview, IL (US)

(73) Assignee: Illinois Tool Works Inc., Glenview, IL (US)

(*) Notice: Subject to any disclaimer, the term of this patent is extended or adjusted under 35 U.S.C. 154(b) by 32 days.

(21) Appl. No.: 17/395,727

(22) Filed: Aug. 6, 2021

(65) Prior Publication Data
US 2022/0041352 A1 Feb. 10, 2022

Related U.S. Application Data

(60) Provisional application No. 63/062,588, filed on Aug. 7, 2020.

(51) Int. Cl.
*B65D 51/16* (2006.01)

(52) U.S. Cl.
CPC ................. *B65D 51/1638* (2013.01)

(58) Field of Classification Search
CPC B65D 51/16; B65D 51/1633; B65D 51/1638; B65D 83/70; B65D 51/1677; H01G 9/12; H01G 11/18; H01G 11/80; H01M 50/3425; Y02E 60/10; F17C 2203/069; F17C 2205/0314
See application file for complete search history.

(56) References Cited

U.S. PATENT DOCUMENTS

| | | | |
|---|---|---|---|
| 3,933,265 A * | 1/1976 | Karlan | B65D 41/0414 215/270 |
| 4,803,136 A | 2/1989 | Bowsky et al. | |
| 5,513,767 A | 5/1996 | Daehn | |

(Continued)

FOREIGN PATENT DOCUMENTS

| | | |
|---|---|---|
| JP | 2008159313 A | 7/2008 |
| WO | 2018138226 A1 | 8/2018 |

OTHER PUBLICATIONS

International Search Report and Written Opinion of the International Searching Authority from corresponding PCT Application No. PCT/US2021/045149, dated Nov. 25, 2021 (35 pages).

*Primary Examiner* — Kareen K Thomas
(74) *Attorney, Agent, or Firm* — Quarles & Brady LLP (57) ABSTRACT

The present disclosure generally relates to a venting system that includes a wall of a lid or a container, the lid or container defining a central longitudinal axis, and a line segment that is measured from the longitudinal axis to an outermost surface of the lid or container, and a pressure relief feature that is disposed along the lid or container. The pressure relief feature includes a thinned region of the lid or container that defines a minimum thickness that is less than 40% of a maximum thickness of the respective lid or container. The pressure relief feature extends at least 180 degrees about the longitudinal axis, and the pressure relief feature is located at a distance from the longitudinal axis of more than 80% of the line segment.

20 Claims, 7 Drawing Sheets

(56) References Cited

U.S. PATENT DOCUMENTS

| | | | | |
|---|---|---|---|---|
| 5,586,588 A * | 12/1996 | Knox | ................... | B67D 1/04 |
| | | | | 141/54 |
| 5,829,614 A * | 11/1998 | Collette | ............... | B29C 49/642 |
| | | | | 220/609 |
| 5,836,364 A * | 11/1998 | Burton | ................ | B67D 1/0456 |
| | | | | 141/2 |
| 6,036,054 A * | 3/2000 | Grill | ..................... | B01F 35/71 |
| | | | | 261/DIG. 7 |
| 6,062,441 A * | 5/2000 | Mengeu | ............. | B65D 47/242 |
| | | | | 222/521 |
| 6,079,589 A * | 6/2000 | Matsuyama | ......... | B65D 47/243 |
| | | | | 222/525 |
| 7,331,491 B2 * | 2/2008 | King | ................... | B65D 47/242 |
| | | | | 222/521 |
| 2008/0017045 A1 * | 1/2008 | McGuire | ............. | B01F 23/707 |
| | | | | 99/323 |
| 2008/0047922 A1 * | 2/2008 | Olson | .................. | B65D 41/12 |
| | | | | 53/488 |
| 2009/0032487 A1 * | 2/2009 | Rekstad | ............ | B65D 47/2031 |
| | | | | 215/260 |
| 2010/0102023 A1 * | 4/2010 | Yarro | .................. | B65D 81/365 |
| | | | | 215/382 |
| 2011/0127232 A1 * | 6/2011 | Willows | .............. | B65D 47/142 |
| | | | | 215/354 |

\* cited by examiner

PRESSURE RELIEF ASSEMBLIES AND METHODS

CROSS REFERENCE TO RELATED APPLICATIONS

The present application claims the benefit of U.S. Application No. 63/062,588, filed on Aug. 7, 2020, and entitled "Pressure Relief Assemblies and Methods," which is incorporated by reference herein in its entirety.

FIELD OF EMBODIMENTS OF THE DISCLOSURE

The present disclosure relates to lids or containers with one or more pressure relief features to allow for venting and depressurization of the container.

BACKGROUND

Various types of containers or canisters are utilized to retain or hold contents that may be initially pressurized, or may become pressurized over time. For example, aerosol canisters may be pressurized with an aerosol, and may retain this initial pressurization until a user causes aerosol to be released, thereby reducing the pressure within the aerosol canister. In some instances, a container may be pressurized, and may maintain the initial level of pressurization throughout the life cycle of the contents of the container. In still other instances, a container may become pressurized over time due to one or more factors that cause the container to become pressurized, such as a chemical reaction that occurs within the container.

In any of the aforementioned pressurization situations, one or more features may be built into or along one or more portions of the container, which may allow for venting of the container in the event that venting becomes necessary. In the scenario where pressure within the container increases after the container has been initially sealed, a venting feature may be included to prevent over-pressurization of the container, which could result in an uncontrolled release of contents from within the container.

While various venting features exist that provide for venting or depressurization of containers that include contents that become pressurized over time, improved devices and methods are needed that can allow for more controlled depressurization based on pre-determined factors associated with the contents of a particular container.

SUMMARY

Embodiments of the present disclosure generally relate to a venting system comprising a wall of a lid or a container, the lid or container defining a central longitudinal axis, and a line segment that is measured from the longitudinal axis to an outermost surface of the lid or container, and a pressure relief feature that is disposed along the lid or container. The pressure relief feature includes a thinned region of the lid or container that defines a minimum thickness that is less than 40% of a maximum thickness of the wall of the respective lid or container. The pressure relief feature extends at least 180 degrees about the longitudinal axis, and the pressure relief feature is located at a distance from the longitudinal axis of more than 80% of the line segment.

In some embodiments, the minimum thickness of the thinned region is less than 30% of the maximum thickness of the respective lid or container. In some embodiments, the minimum thickness of the thinned region is less than 20% of the maximum thickness of the respective lid or container. In some embodiments, the pressure relief feature is located at a distance from the longitudinal axis of more than 90% of the line segment. In some embodiments, the pressure relief feature includes a first notch along an inner side of the lid or container, and a second notch along an outer side of the lid or container, and the thinned region is disposed between the first notch and the second notch. In some embodiments, the pressure relief feature consists of a first notch that is disposed only on an outer side of the lid or container. In some embodiments, the pressure relief feature consists of a first notch that is disposed only on an inner side of the lid or container.

In some embodiments, a venting system includes a container comprising a sidewall and defining a central longitudinal axis, and a line segment that is measured from the longitudinal axis to an outermost surface of the container. The venting system further includes a lid that is coupled with the container at an open end thereof, and a pressure relief feature that is disposed within a sidewall of the container. The pressure relief feature includes a thinned region that defines a minimum thickness that is less than 40% of a maximum thickness of the sidewall of the container, the pressure relief feature extends at least 180 degrees about the longitudinal axis, and the pressure relief feature is located at a radial distance from the longitudinal axis of more than 95% of the line segment.

In some embodiments, the pressure relief feature is disposed at a bottom end of the container, closer to a bottom wall than an upper end of the container. In some embodiments, the pressure relief feature is disposed at an upper end of the container. In some embodiments, the thinned region defines a first region and a second region, and the first region is thinner than the second region, and the second region is thinner than the sidewall. In some embodiments, the thinned region defines a surface having a parabolic configuration. In some embodiments, the pressure relief feature defines a first notch along an outer surface or an inner surface of the sidewall. In some embodiments, the pressure relief feature also defines a second notch along the other of the outer surface or the inner surface of the sidewall.

In some embodiments, a venting system includes a wall of a lid or container, the lid or container defining a central longitudinal axis, and a line segment that is measured from the longitudinal axis to an outermost surface of the lid or container, and a pressure relief feature that is disposed along the lid or container. In some embodiments, the pressure relief feature includes a thinned region of the lid or container that defines a minimum thickness that is less than 40% of a maximum thickness of the wall of the respective lid or container, and the thinned region is defined by a curved surface and at least one flat surface on opposing sides thereof.

In some embodiments, the at least one flat surface includes a plurality of flat surfaces that define a geometric shape in cross-section. In some embodiments, the pressure relief feature is disposed along the lid, and is disposed at an intersection of a center wall and an outer wall of the lid. In some embodiments, the pressure relief feature is defined at least in part by a semi-circular notch that is disposed along an inner surface of the container. In some embodiments, the at least one flat surface includes a first flat surface and a second flat surface that are connected by an intermediate flat surface and that define a notch, and the first flat surface defines a first plane, the second flat surface defines a second plane, and the first plane and the second plane intersect to form an acute angle. In some embodiments, the pressure relief feature extends at least 180 degrees about the longitudinal axis.

DETAILED DESCRIPTION

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Throughout the disclosure, the terms "about" and "approximately" mean plus or minus 5% of the number that each term precedes.

Embodiments of the present disclosure provide for a container that may include a lid, plate, or another type of closure for enclosing contents within the container, the lid or container having one or more pressure relief or venting features that allow for controlled and targeted pressure relief when a maximum pressure threshold has been achieved within the container. Upon reaching maximum pressure, the container ruptures at one or more locations along the respective pressure relief feature to allow for depressurization. The venting or pressure relief features described herein may be formed along all or a portion of a peripheral edge of the container or the lid, or both. The venting features of the present disclosure may be implemented in a wide variety of technologies, including applications related to aerosol containers, battery cell containers, capacitors, and pressure vessels. In each of the aforementioned applications, pressure release may be required due to pressure build-up within the container, and the venting features disclosed herein may allow for depressurization or expulsion once a maximum pressure threshold has been reached.

Figure 1:
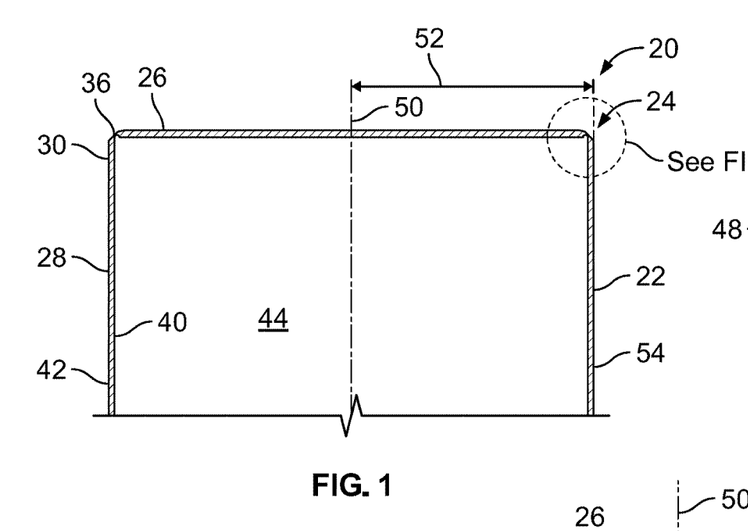
FIG. 1 is a cross-sectional, side view of a container with a first embodiment of a pressure relief feature taken through line 1-1 of FIG. 3.
Figure 2:
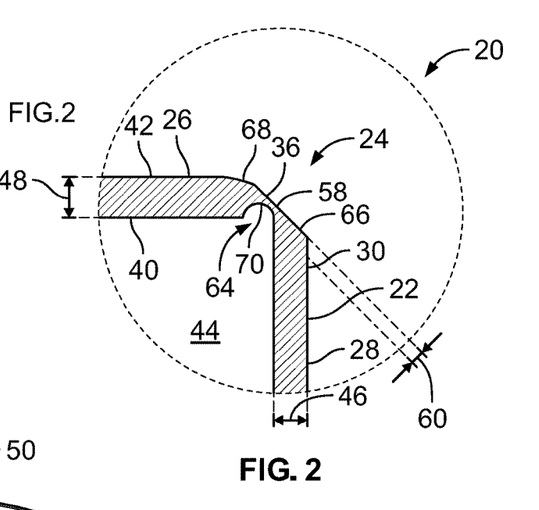
FIG. 2 is an enlarged view of an edge of the container of FIG. 1 depicting the pressure relief feature in detail.
Figure 3:
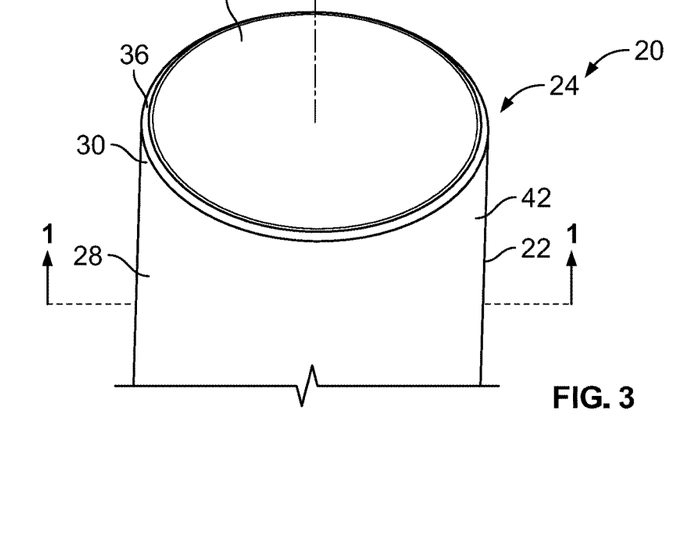
FIG. 3 is a bottom isometric view of the container of FIG. 1 depicting the pressure relief feature extending 360 degrees around the container.

Referring in particular to FIGS. 1-3, a first embodiment of a venting system 20 comprising a container 22 is shown with a pressure relief feature 24 formed therein. The container 22 includes a bottom wall 26 and a sidewall 28. While the wall 26 is referred to as being a bottom wall 26, it is contemplated that the bottom wall 26 may be a top wall 26, or may define a different, non-vertical orientation. The container 22 further includes a bottom end 30 and an upper end 32 (see FIG. 14). The sidewall 28 is generally cylindrical in cross-section and extends from a corner 36 that connects the sidewall 28 with the bottom wall 26. The bottom wall 26 and the sidewall 28 each define an inner surface 40 and an outer surface 42. The inner surface 40 defines an interior volume 44 of the container 22, while the outer surface 42 defines an exterior profile of the container 22. The sidewall 28 further defines a sidewall thickness 46, while the bottom wall 26 defines a bottom wall thickness 48. In some embodiments, the sidewall thickness 46 may be the same as the bottom wall thickness 48, and in some embodiments, the thicknesses 46, 48 may be different. A maximum thickness of the thicknesses 46, 48 is discussed below with respect to the various proportions of the pressure relief features 24.

Referring to FIG. 1, a longitudinal axis 50 extends centrally through the bottom wall 26, and in the present embodiment, the container 22 is radially symmetric about the longitudinal axis 50 since the pressure relief feature 24 extends 360 degrees around the corner 36 of the container 22. The longitudinal axis 50 is shown extending centrally through the container 22, and a line segment or radius 52 of the container is shown, being measured from the longitudinal axis 50 to an outermost surface 54 of the container 22. While the pressure relief feature 24 is shown being more than about 95% of the radius from the longitudinal axis 50, the pressure relief feature 24 may be more than about 90% of the radius 52 from the longitudinal axis 50, or more than about 85% of the radius 52 from the longitudinal axis 50, or more than about 80% of the radius 52 from the longitudinal axis 50. The aforementioned distances are taken along the line segment or radius 52 in relation to the outermost surface 54 taken along the particular line segment.

While the container 22 of the present disclosure is depicted as a cylindrical container, it is contemplated that the container 22 may take varying forms, and may have a cross-section that is prismatic, rectangular, or cubic. To that end, the line segment 52 as disclosed herein may reference the distance from the longitudinal axis 50 of the container 22 to the outermost surface 54 of one or more straight or flat walls (not shown) that may define a sidewall of the container 22. In embodiments that include a prismatic, rectangular, or cubic cross-section, the length of the line segment 52 may vary about the longitudinal axis 50, while in the present embodiment, the radius 52 is identical about the longitudinal axis 50 since the container 22 defines a circular cross section. While the container 22 of the present embodiment is radially symmetric, prismatic, rectangular, or cubic containers may be symmetric about one, two, three, four, or more planes that intersect the longitudinal axis 50.

Referring to FIG. 2, the pressure relief feature 24 is shown in detail, and is generally located in or along the corner 36 of the container 22. The pressure relief feature 24 includes a thinned region 58 between the inner surface 40 and the outer surface 42, which is configured to rupture to release pressure from the container 22, if necessary. The thinned region 58 has a region thickness 60 that is less than about 20% of the maximum thickness of the thicknesses 46, 48. In some embodiments, the thinned region 58 has a region thickness 60 that is less than about 25% of the maximum thickness of the thicknesses 46, 48, or a region thickness 60 that is less than about 30% of the maximum thickness of the thicknesses 46, 48, or a region thickness 60 that is less than about 35% of the maximum thickness of the thicknesses 46, 48, or a region thickness 60 that is less than about 40% of the maximum thickness of the thicknesses 46, 48. The region thickness 60 may be adjusted based on a desired performance of the venting system 20.

Still referring to FIG. 2, the pressure relief feature 24 further includes a first notch 64, which may be a semicircular notch, groove, or cutout, which is formed along the inner surface 40, and further includes a first angled surface 66 that is disposed along the outer surface 42. In some embodiments, the first notch 64 may define a different geometric cross section, and may be triangular, square-shaped, conical, trapezoidal, or define another type of polygon. A second angled surface 68 extends from the first angled surface 66 to join the outer surface 42 of the bottom wall 26. The notch 64 further defines a curved surface 70, which forms a portion of the inner surface 40. In some embodiments, the thinned region 58 is formed continuously around the entire corner 36 of the container 22, e.g., 360 degrees about the longitudinal axis 50. In other embodiments, the thinned region 58 may be formed along only a portion of the corner 36, or may discontinuously extend around the entire corner 36, e.g., thinned segments interrupted by full segments. Additionally, while the thinned region 58 is shown on one end, i.e., a bottom end 30 of the container 22, the thinned region 58 may be formed at the bottom end 30 and/or the upper end 32 of the container 22. In some embodiments, the opposite or upper end of the container 22 may include a lid 74 (see FIGS. 10-16) or other closing and/or dispensing feature.

Figure 4:
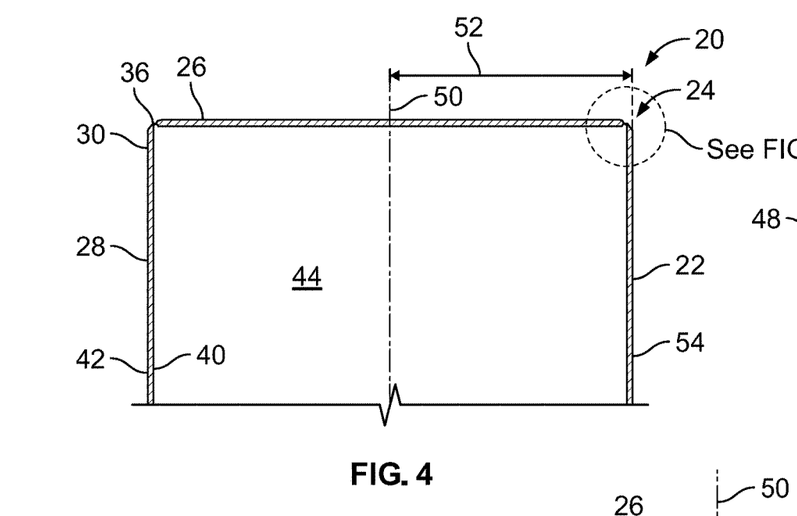
FIG. 4 is a cross-sectional view of a container with a second embodiment of a pressure relief feature taken through line 4-4 of FIG. 6.
Figure 5:
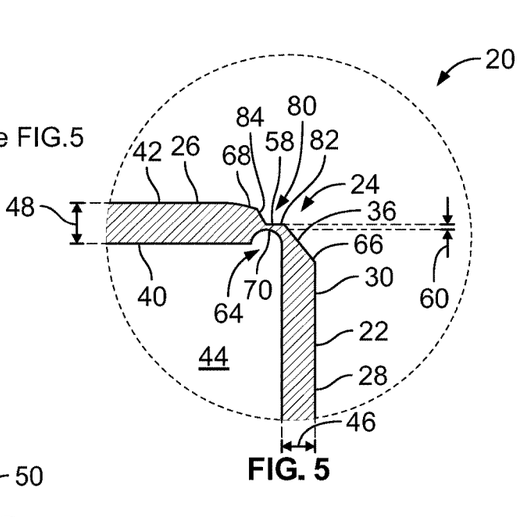
FIG. 5 is an enlarged view of an edge of the container of FIG. 4 depicting the pressure relief feature in detail.
Figure 6:
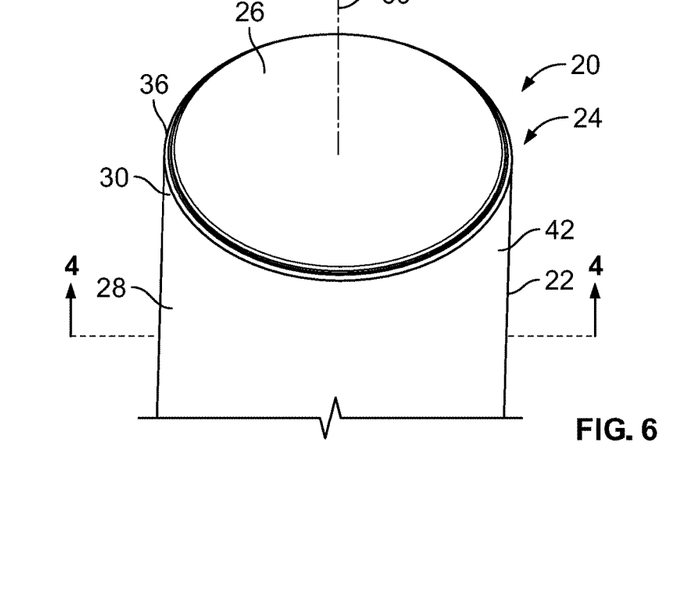
FIG. 6 is a bottom isometric view of the container of FIG. 4 depicting the pressure relief feature extending 360 degrees around the container.

Referring now to FIGS. 4-6, a second embodiment of the venting system 20 comprising the container 22 is shown with the pressure relief feature 24 formed therein. The container 22 includes the bottom wall 26 and the sidewall 28. The sidewall 28 is generally cylindrical in cross-section, and extends from the bottom wall 26 at the corner 36. The bottom wall 26 and the sidewall 28 each define the inner surface 40 and the outer surface 42. The inner surface 40 defines an interior volume 44 of the container 22, while the outer surface 42 defines an exterior profile of the container 22. The sidewall 28 further defines a sidewall thickness 46, while the bottom wall 26 defines a bottom wall thickness 48. The longitudinal axis 50 extends centrally through the bottom wall 26, and in the present embodiment, the container 22 is radially symmetric about the longitudinal axis 50.

Referring to FIG. 5, the pressure relief feature 24 is generally located in or along the corner 36 of the container 22. The pressure relief feature 24 includes the thinned region 58 between the inner surface 40 and the outer surface 42, which is configured to rupture to release pressure from the container 22, if necessary. The thicknesses 46, 48 and the region thickness 60 are further shown, and are similar or identical to those described above with respect to FIGS. 1-3. The thinned region 58 is formed by the notch 64 formed by the inner surface 40 of the container 22, the first angled surface 66 and the second angled surface 68, and a v-shaped cutout 80 that is disposed between the first angled surface 66 and the second angled surface 68. The v-shaped cutout 80 defines a first segment 82 and a second segment 84 that intersect to define an obtuse angle in cross-section. The first angled surface 66 intersects with the first segment 82, and the second angled surface 68 intersects with the second segment 84.

In some embodiments, the thinned region 58 is formed continuously around the entire corner 36 of the container 22, e.g., 360 degrees about the longitudinal axis 50. In other embodiments, the thinned region 58 may be formed along only a portion of the corner 36, or may discontinuously extend around the entire corner 36, e.g., thinned segments interrupted by full segments. Additionally, while the thinned region 58 is shown on one end, i.e., a bottom end 30 of the container 22, the thinned region 58 may be formed at the bottom end 30 and/or an upper end (not shown) of the container 22. In some embodiments, the opposite or upper end of the container 22 may include a lid (not shown) or other closing and/or dispensing feature.

Figure 7:
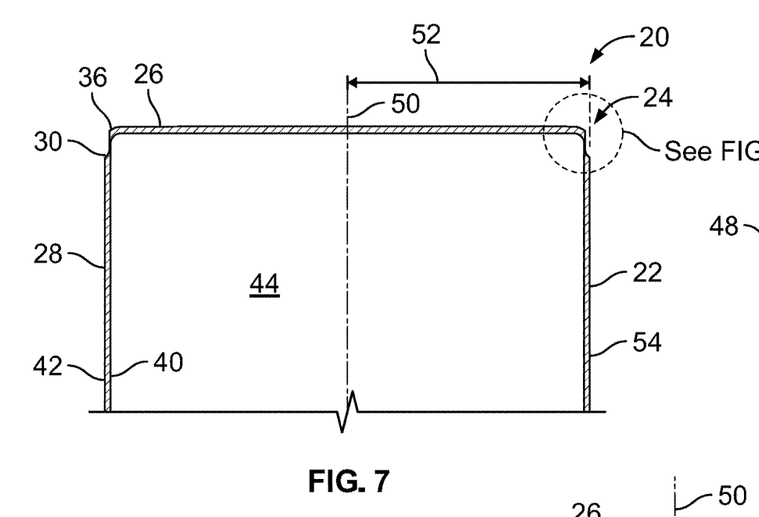
FIG. 7 is a cross-sectional view of a container with a third embodiment of a pressure relief feature taken through line 7-7 of FIG. 9.
Figure 8:
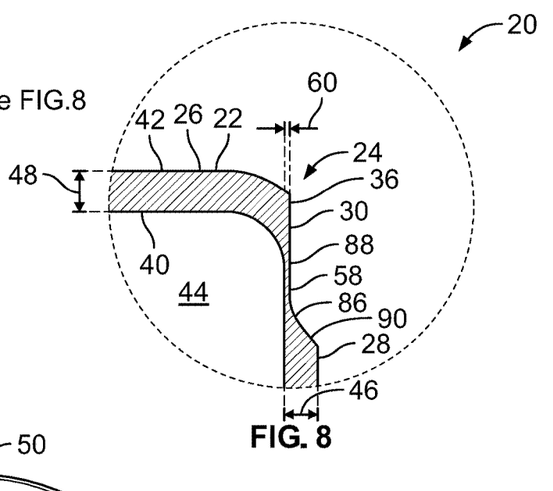
FIG. 8 is an enlarged view of an edge of the container of FIG. 7 depicting the pressure relief feature in detail.
Figure 9:
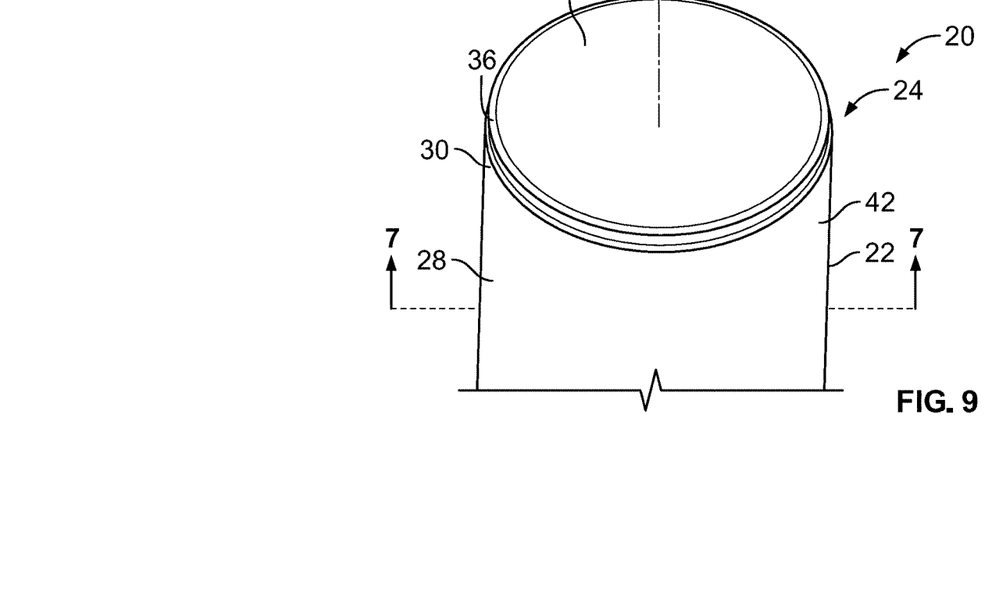
FIG. 9 is a bottom isometric view of the container of FIG. 7 depicting the pressure relief feature extending 360 degrees around the container.

Referring now to FIGS. 7-9, a third embodiment of the venting system 20 comprising the container 22 is shown with a pressure relief feature 24 formed therein. The container 22 includes the bottom wall 26 and the sidewall 28. The sidewall 28 is generally cylindrical in cross-section and extends from the bottom wall 26 at the corner 36. The bottom wall 26 and the sidewall 28 each define an inner surface 40 and an outer surface 42. The inner surface 40 defines an interior volume 44 of the container 22, while the outer surface 42 defines an exterior profile of the container 22. The sidewall 28 further defines a sidewall thickness 46, while the bottom wall 26 defines a bottom wall thickness 48. The longitudinal axis 50 extends centrally through the bottom wall 26, and in the present embodiment, the container 22 is radially symmetric about the longitudinal axis 50.

Referring to FIG. 8, the pressure relief feature 24 is generally located in or along the corner 36 of the container 22. The pressure relief feature 24 generally includes the thinned region 58 between the inner surface 40 and the outer surface 42, which is configured to rupture to release pressure from the container 22, if necessary. The thicknesses 46, 48 and the region thickness 60 are further shown, and are similar or identical to those described above with respect to FIGS. 1-3. The thinned region 58 is formed between the inner surface 40 of the container 22 and a spline-shaped or parabolic surface 86 formed along the outer surface 42 of the container 22. The parabolic surface defines a straight surface 88 that may be a linear or straight segment, and a curved surface 90 that extends from the straight surface 88 to the outer surface 42 of the sidewall 28.

In some embodiments, the thinned region 58 is formed continuously around the entire corner 36 of the container 22, e.g., 360 degrees about the longitudinal axis 50. In other embodiments, the thinned region 58 may be formed along only a portion of the corner 36, or may discontinuously extend around the entire corner 36, e.g., thinned segments interrupted by full segments. Additionally, while the thinned region 58 is shown on one end, i.e., a bottom end 30 of the container 22, the thinned region 58 may be formed at the bottom end 30 and/or an upper end (not shown) of the container 22. In some embodiments, the opposite or upper end of the container 22 may include a lid (not shown) or other closing and/or dispensing feature.

While the aforementioned embodiments of FIGS. 1-9 depict the pressure relief feature 24 disposed along the container 22, and more specifically along the corner 36 that connects the bottom wall 26 with the sidewall 28 of the container 22, the embodiments of FIGS. 10-16 illustrate a multi-component vessel that includes both a container 22 and a lid 74, which may both, or individually, include one or more pressure relief features 24. In the embodiments described below, the lid 74 may be coupled with the container 22 by any coupling technique known in the art, such as welding or brazing. While the embodiments disclosed herein illustrate the lid 74 being coupled with an upper end 32 of the container 22, alternative embodiments are contemplated where the lid 74 is coupled to the lid 74 at a point located intermediate or between the bottom wall 26 and the upper end 32 of the container 22. Still further, one or more of the pressure relief features 24 disclosed above with respect to FIGS. 1-9 may be used in combination with one or more of the pressure relief features 24 discussed herein with respect to the lid 74 and container 22.

Figure 10:
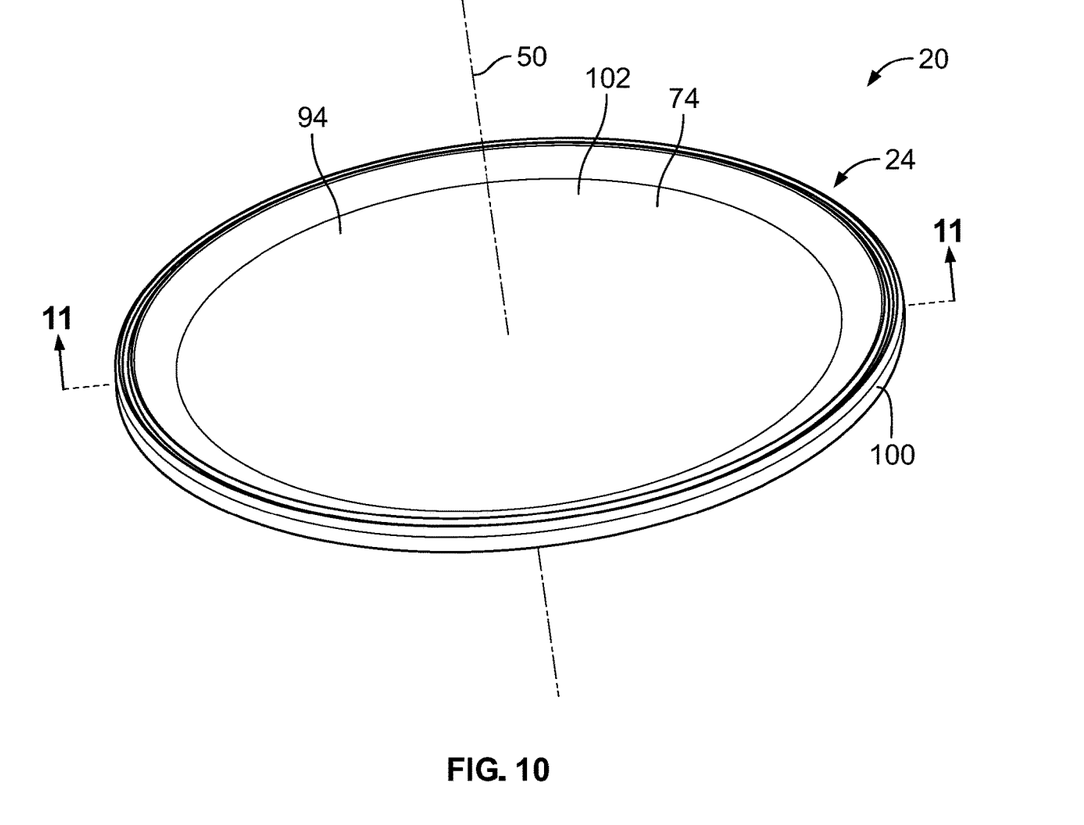
FIG. 10 is a top isometric view of a lid with a fourth embodiment of a pressure relief feature, the lid being configured to be coupled with a container.
Figure 11:
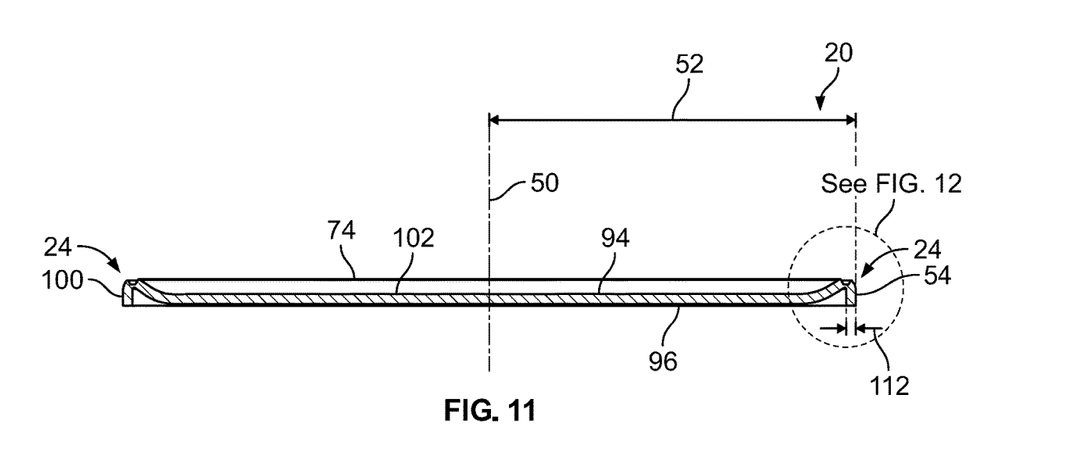
FIG. 11 is a side cross-sectional view taken through line 11-11 of FIG. 10.
Figure 12:
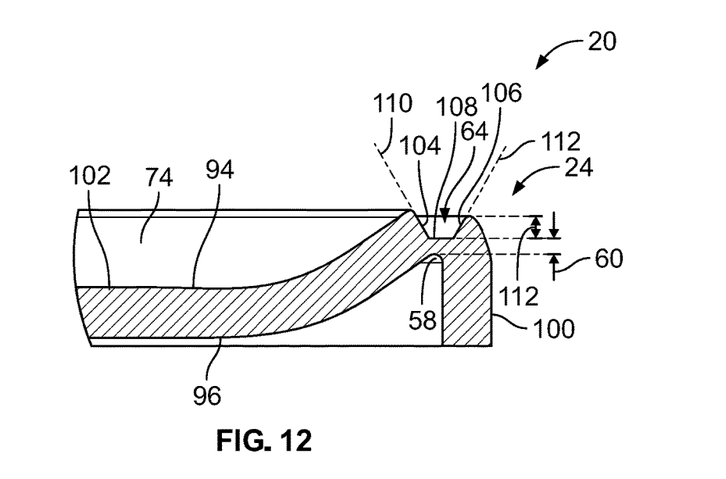
FIG. 12 is an enlarged detail view of a portion of FIG. 11.

Referring now to FIGS. 10-12, an embodiment of the venting system 20 comprising the lid 74 is shown, which may be a plate, lid, or closure, and may define a bottom wall, a top wall, or a sidewall of a container (not shown). The container may be similar to the containers 22 discussed above with respect to FIGS. 1-9, but may not include any pressure relief features therein or therealong. Referring specifically to FIG. 10, a top isometric view of the lid 74 is depicted, which highlights a first pressure relief feature 24 along a first or top surface 94 of the lid 74. A second or bottom surface 96 is located opposite the top surface 94. While the lid 74 is described and shown in the various figures as having top and bottom surfaces or sides 94, 96, it should be understood that the lid 74 may be disposed with either of its top side 94 and bottom side 96 in an upward-facing or downward-facing configuration and need not be limited to the orientations depicted within the figures. The lid 74 disclosed herein may be adapted to be connected to the upper end of the sidewall of a canister or container, as described above.

As will be described hereinafter below, the pressure relief feature 24 along the lid 74 in FIGS. 10-12 allows for controlled and targeted pressure relief when a maximum pressure threshold has been achieved within a container or canister to which the lid 74 has been applied. Referring to FIGS. 11 and 12, the pressure relief feature 24 of the present embodiment is a first notch 64 that defines a generally trapezoidal profile with curved or flared sides. While not specifically shown in the figures, in some embodiments, the first notch 64 may be disposed along both the top side 94 and the bottom side 96 of the lid 74. The pressure relief feature 24 may be a cutout that defines one or more flat or planar surfaces, in a similar fashion as the pressure relief features 24 described above. Alternatively, the pressure relief feature 24 may be a cutout that defines only curved surfaces.

Referring to FIGS. 10 and 11, the lid 74 is generally disc-shaped and defines an outer wall 100 that circumscribes a perimeter of the lid 74. The outer wall 100 joins a center wall 102 at the corner 36 defining the thinned region 58 of the lid 74. The corner 36 is generally rounded and defines portions of the top side 94 and the bottom side 96 of the lid 74. The first notch 64 is disposed between the outer wall 100 and the center wall 102. In some embodiments, one or more additional features, such as corners, intermediate walls, or other features are provided along or within the center wall 102. The walls 100, 102 each define the top or outer side 94 and the bottom or inner side 96. The top side 94 of the walls 100, 102 is generally contiguous, but is interrupted by the first notch 64. The bottom side 96 of the walls 100, 102 is generally contiguous, and is not interrupted by a notch.

The thinned region 58 is disposed between the inner side 96 and the notch 64 and creates a membrane or rupture wall that is configured to rupture at a particular pressure threshold. The thicknesses 46, 48 and the region thickness 60 are further shown, and are similar or identical to those described above with respect to FIGS. 1-3. The pressure relief feature 24, which includes the first notch 64 and the thinned region 58, may extend 360 degrees about the longitudinal axis 50. Further, the first notch 64 may be disposed along or cutout from the lid 74 in a similar fashion as described above with respect to the pressure relief features of FIGS. 1-9.

Referring specifically to FIG. 12, the first notch 64 is defined by a first or top inner side surface 104 and a second or top outer side surface 106, which are connected to one another by a first planar surface 108. The first planar surface 108 and the inner surface 40 define the thinned region 58, which is configured as a rupture wall. The first corner 36 is disposed along the opposing side of the thinned region 58. While the first surface 104 and the second surface 106 define curved portions that intersect with the top side 94, the first surface 104, and the second surface 106 comprise straight or planar portions that define a first plane 110 and a second plane 112, respectively, which pass over each of the first surface 104 and the second surface 106 to form a trapezoidal configuration. The thinned region 58 that is disposed between the first notch 64 and the inner surface 40 defines a minimum membrane thickness or distance 60, as shown in FIG. 12. Further, the first notch 64 defines a maximum depth that is a distance 112. Referring again to FIG. 11, the walls 100, 102 preferably have a thickness 112 that is similar or identical. The thickness 60 of the thinned region 58 may have similar rations with respect to the thickness 112 as described above with respect to FIGS. 1-3.

Figure 13:
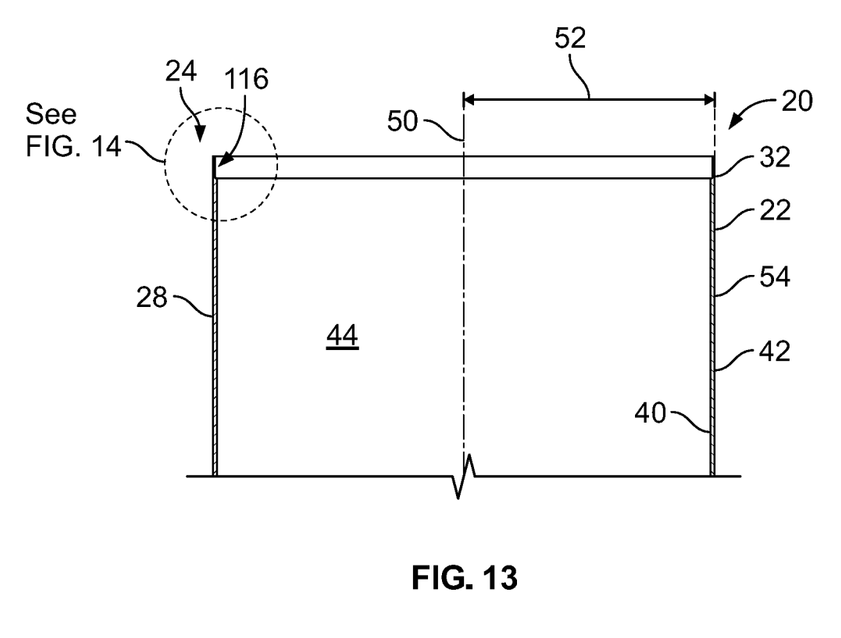
FIG. 13 is a side cross-sectional view of a container with a fifth embodiment of a pressure relief feature.
Figure 14:
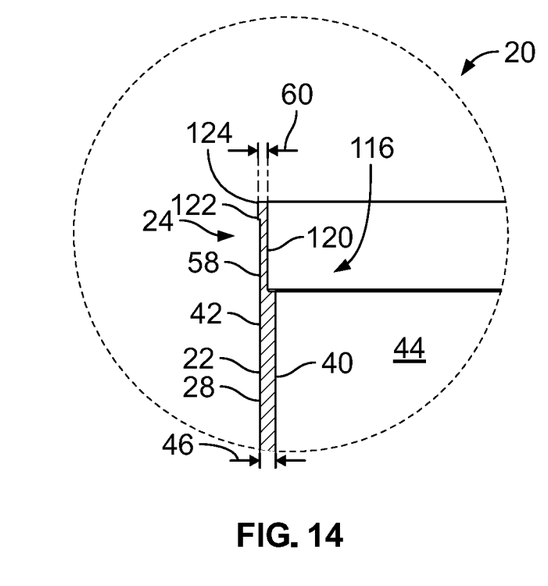
FIG. 14 is an enlarged detail view of a portion of FIG. 14.
Figure 15:
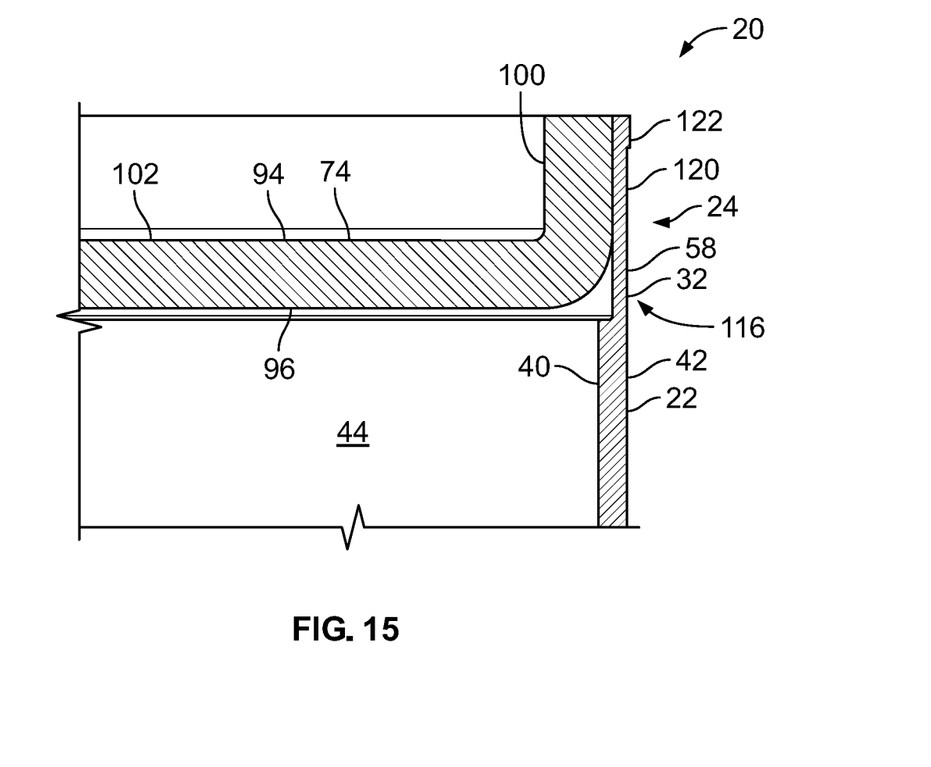
FIG. 15 is a detail cross-sectional view of a lid that is coupled with the container of FIG. 13.

Referring now to FIGS. 13-15, another embodiment of the venting system 20 is shown, which includes the pressure relief feature 24 disposed along the container 22, and further includes the lid 74 (see FIG. 15). The container 22 includes the sidewall 28 and defines a central longitudinal axis 50. In this particular embodiment, the pressure relief feature 24 includes a stepped portion 116 where the sidewall 28 is inset and the upper end 32 of the container 22 includes the thinned region 58, which is relatively thinner than the thickness 46 of the sidewall 28. The thinned region 58 includes a first region 120 and a second region 122, which is disposed above the first region 120. The first region 120 is thinner than the second region 122, which includes a rim 124 that extends radially outward from the upper end 32 of the container 22. The stepped portion 116 is configured to receive the lid 74, as shown in FIG. 15. The thicknesses 46, 48 and the region thickness 60 are further shown, and are similar or identical to those described above with respect to FIGS. 1-3.

Referring to FIG. 15, the container 22 and the lid 74 are shown coupled to one another, preferably using one of the coupling techniques discussed above. While the lid 74 does not include one of the pressure relief features 24 disclosed herein, it is contemplated that one or more of the pressure relief features discussed above may be applied to the lid 74 of the present embodiment. The thinned region 58 of the container 22 is shown in greater detail, which is configured to yield or rupture when a maximum pressure has been achieved within the container 22. The first region 120 and the second region 122 of the thinned region 58 are further shown in FIG. 15, and the container 22 is preferably configured to yield along the first region 120 of the thinned region where the lid 74 is not coupled with the container 22.

In some embodiments, the thinned region 58 may be intermittently located about the longitudinal axis 50, such that the thinned region 58 may be interrupted by regions of normal thickness. To that end, in some embodiments there may be between about 10 and about 100 discrete thinned regions 58, or between about 20 and 90 discrete thinned regions 58, or between about 30 and 80 discrete thinned regions 58, or between about 40 and 70 thinned discrete thinned regions 58, or more than 10 discrete thinned regions 58, or more than 20 discrete thinned regions 58, or more than 30 discrete thinned regions 58, or more than 40 discrete thinned regions 58, or more than 50 discrete thinned regions 58, or more than 60 discrete thinned regions 58, or more than 70 discrete thinned regions 58, or more than 80 discrete thinned regions 58, or more than 90 discrete thinned regions 58.

In some embodiments, the pressure relief features 24 and, thus, thinned regions 58 may extend between about 10 degrees and about 350 degrees about the axis 50, or between about 20 degrees and about 340 degrees about the axis 50, or between about 30 degrees and about 330 degrees about the axis 50, or between about 40 degrees and about 320 degrees about the axis 50, or between about 50 degrees and about 310 degrees about the axis 50, or between about 60 degrees and about 300 degrees about the axis 50, or between about 70 degrees and about 290 degrees about the axis 50, or between about 80 degrees and about 280 degrees about the axis 50, or between about 90 degrees and about 270 degrees about the axis 50, or between about 100 degrees and about 260 degrees about the axis 50, or between about 110 degrees and about 250 degrees about the axis 50, or between about 120 degrees and about 240 degrees about the axis 50, or between about 130 degrees and about 230 degrees about the axis 50, or between about 140 degrees and about 220 degrees about the axis 50, or between about 150 degrees and about 210 degrees about the axis 50, or between about 160 degrees and about 200 degrees about the axis 50, or between about 170 degrees and about 190 degrees about the axis 50.

In some embodiments, the pressure relief features 24 and, thus, thinned regions 58 may extend about 10 degrees, or about 20 degrees, or about 30 degrees, or about 40 degrees, or about 50 degrees, or about 60 degrees, or about 70 degrees, or about 80 degrees, or about 90 degrees, or about 100 degrees, or about 110 degrees, or about 120 degrees, or about 130 degrees, or about 140 degrees, or about 150 degrees, or about 160 degrees, or about 170 degrees, or about 180 degrees, or about 190 degrees, or about 200 degrees, or about 210 degrees, or about 220 degrees, or about 230 degrees, or about 240 degrees, or about 250 degrees, or about 260 degrees, or about 270 degrees, or about 280 degrees, or about 290 degrees, or about 300 degrees, or about 310 degrees, or about 320 degrees, or about 330 degrees, or about 340 degrees, or about 350 degrees, or about 360 degrees about the axis 50.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

It will be appreciated by those skilled in the art that while the embodiments of the present disclosure have been described in connection with particular embodiments and examples, the disclosure is not necessarily so limited, and that numerous other embodiments, examples, uses, modifications and departures from the embodiments, examples, and uses are intended to be encompassed by the claims attached hereto. Various features and advantages of the invention are set forth in the following claims.

We claim:

1. A venting system, comprising:
a wall of a lid or a container, the lid or container defining a central longitudinal axis, and a line segment that is measured from the central longitudinal axis to an outermost surface of the lid or container; and
a pressure relief feature that is disposed along the lid or container,
wherein the pressure relief feature includes a thinned region of the lid or container that defines a minimum thickness that is less than 40% of a maximum thickness of the wall of the respective lid or container,
wherein the pressure relief feature extends at least 180 degrees about the central longitudinal axis, and
wherein the pressure relief feature is located at a distance from the central longitudinal axis of more than 80% of the line segment.

2. The venting system of claim 1, wherein the minimum thickness of the thinned region is less than 30% of the maximum thickness of the respective lid or container.

3. The venting system of claim 1, wherein the minimum thickness of the thinned region is less than 20% of the maximum thickness of the respective lid or container.

4. The venting system of claim 1, wherein the pressure relief feature is located at a distance from the central longitudinal axis of more than 90% of the line segment.

5. The venting system of claim 1, wherein the pressure relief feature includes a first notch along an inner side of the lid or container, and a second notch along an outer side of the lid or container, and
wherein the thinned region is disposed between the first notch and the second notch.

6. The venting system of claim 1, wherein the pressure relief feature consists of a first notch that is disposed only on an outer side of the lid or container.

7. The venting system of claim 1, wherein the pressure relief feature consists of a first notch that is disposed only on an inner side of the lid or container.

8. A venting system, comprising:
a container comprising a sidewall and defining a central longitudinal axis, and a line segment that is measured from the central longitudinal axis to an outermost surface of the container,
a lid that is coupled with the container at an open end thereof; and
a pressure relief feature that is disposed within a sidewall of the container, wherein the pressure relief feature includes a thinned region that defines a minimum thickness that is less than 40% of a maximum thickness of the sidewall of the container, wherein the pressure relief feature extends at least 180 degrees about the central longitudinal axis, and wherein the pressure relief feature is located at a radial distance from the central longitudinal axis of more than 95% of the line segment.

9. The venting system of claim 8, wherein the pressure relief feature is disposed at a bottom end the container, closer to a bottom wall than an upper end of the container.

10. The venting system of claim 8, wherein the pressure relief feature is disposed at an upper end of the container.

11. The venting system of claim 10, wherein the thinned region defines a first region and a second region, and wherein the first region is thinner than the second region, and the second region is thinner than the sidewall.

12. The venting system of claim 8, wherein the thinned region defines a surface having a parabolic configuration.

13. The venting system of claim 8, wherein the pressure relief feature defines a first notch along an outer surface or an inner surface of the sidewall.

14. The venting feature of claim 13, wherein the pressure relief feature also defines a second notch along the other of the outer surface or the inner surface of the sidewall.

15. A venting system, comprising:

a wall of a lid or a container, the lid or container defining a central longitudinal axis, and a line segment that is measured from the central longitudinal axis to an outermost surface of the lid or container; and a pressure relief feature that is disposed along the lid or container, wherein the pressure relief feature includes a thinned region of the lid or container that defines a minimum thickness that is less than 40% of a maximum thickness of the wall of the respective lid or container, and wherein the thinned region is defined by a curved surface and at least one flat surface on opposing sides thereof.

16. The venting system of claim 15, wherein the at least one flat surface includes a plurality of flat surfaces that define a geometric shape in cross-section.

17. The venting system of claim 15, wherein the pressure relief feature is disposed along the lid, and is disposed at an intersection of a center wall and an outer wall of the lid.

18. The venting system of claim 15, wherein the pressure relief feature is defined, at least in part, by a semi-circular notch that is disposed along an inner surface of the container.

19. The venting system of claim 15, wherein the at least one flat surface includes a first flat surface and a second flat surface that are connected by an intermediate flat surface and that define a notch, and wherein the first flat surface defines a first plane, the second flat surface defines a second plane, and the first plane and the second plane intersect to form an acute angle.

20. The venting system of claim 15, wherein the pressure relief feature extends at least 180 degrees about the central longitudinal axis.

* * * * *